United States Patent [19]

Allred

[11] Patent Number: 4,752,403
[45] Date of Patent: Jun. 21, 1988

[54] WATER RECOVERY DEVICE

[76] Inventor: Jack D. Allred, 3 Dorado Pl., Clearwater, Fla. 33570

[21] Appl. No.: 33,439

[22] Filed: Apr. 1, 1987

[51] Int. Cl.$^4$ .................... B01D 27/12; B01D 29/10; B01D 29/38
[52] U.S. Cl. .................... 210/767; 210/305; 210/323.2; 210/333.01; 210/411; 210/456
[58] Field of Search .............. 210/108, 117, 170, 247, 210/304, 305, 314, 323.2, 333.01, 333.1, 411, 416.1, 439, 453, 454, 456, 767, 787, 512.1; 166/265, 105.1

[56] References Cited

U.S. PATENT DOCUMENTS

| | | | |
|---|---|---|---|
| 2,525,897 | 10/1950 | Greene | 166/105.1 |
| 2,665,643 | 1/1954 | Greene | 166/105.1 |
| 2,665,644 | 1/1954 | Wells | 166/105.1 |
| 2,665,645 | 1/1954 | Wells | 166/105.1 |
| 3,193,103 | 7/1965 | Snyder | 210/411 |
| 3,289,608 | 12/1966 | Laval, Jr. | 210/512.1 |
| 4,476,925 | 10/1984 | Cox | 166/105.1 |

OTHER PUBLICATIONS

Hawley, Gessner G., Ed., *The Condensed Chemical Dictionary*, Eighth Edition, p. 714.

Primary Examiner—Richard V. Fisher
Assistant Examiner—Richard D. Jordan
Attorney, Agent, or Firm—Herbert W. Larson

[57] ABSTRACT

Water straining device for removing sand, grit and other foreign suspended particles from water characterized by a cylindrical housing having a bottom closed end and an open top end together with multiple annular holes through the cylindrical side wall. Cylindrical baffles are mounted inside the housing adjacent each hole. At least one strainer containing multiple slots is located inboard of the baffles and is connected at one end to a pump with a one way valve interposed between the strainer and pump. A backwash system is connected to the inside of the housing to remove particles clogging the strainer slots.

18 Claims, 2 Drawing Sheets

U.S. Patent  Jun. 21, 1988  Sheet 1 of 2  4,752,403
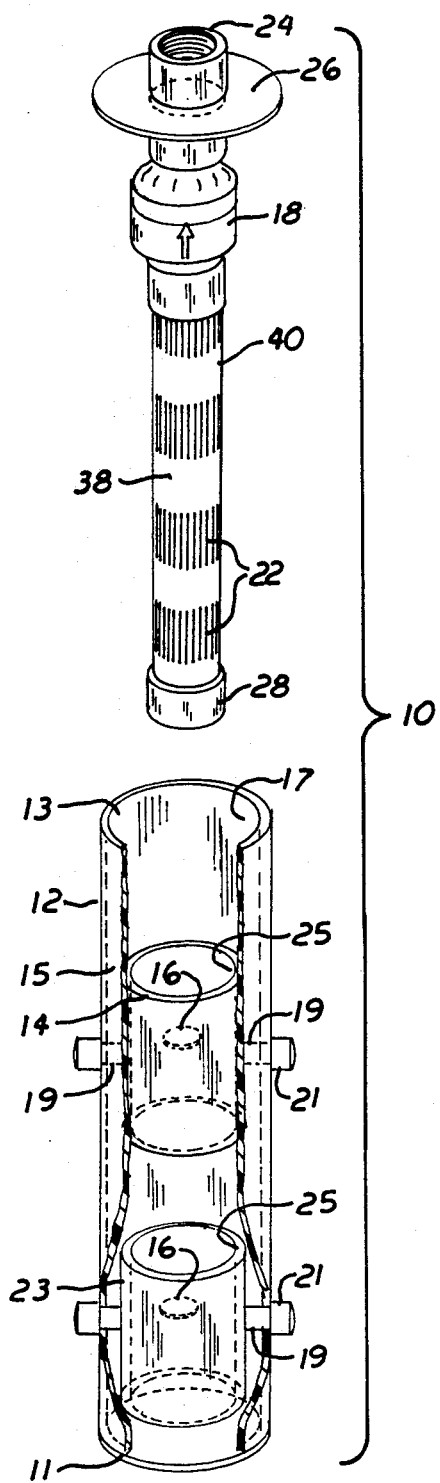
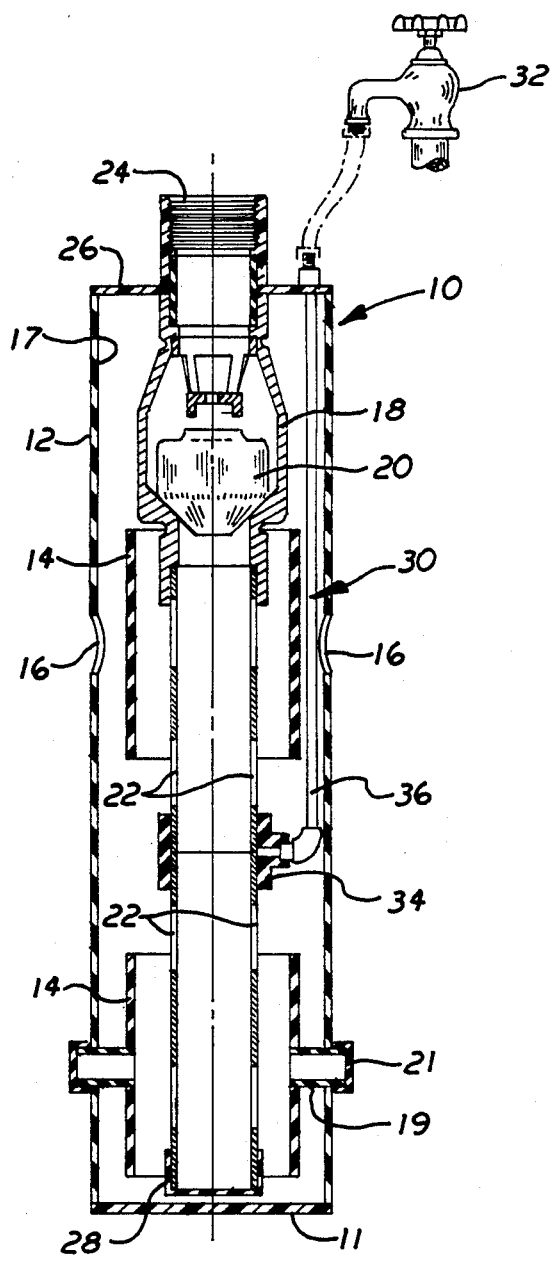
FIG. 1
FIG. 2

WATER RECOVERY DEVICE

BACKGROUND OF THE INVENTION

1. Field of the Invention

This invention relates to a water recovery device. More particularly, it refers to a device for recovering debris free water from a holding tank receiving water from a washing cycle or some other source containing sand, grit and other suspended particles.

2. Description of the Prior Art

Techniques and devices for removing sand and other foreign suspended particles from water have been well known in the prior art. In particular, U.S. Pat. No. 3,289,608 describes a technique and a device for separating sand and other suspended foreign particles from pumped water. The sand separator contains a tubular frusto-conical chamber having a constricted lower end. Alternate separators shown have a longitudinal housing with slots therein. Although this device works satisfactorily, it suffers from deterioration of parts and high cost of components needed to maintain the required centrifugal forces. A water separating device is needed containing non-destroyable components at low cost.

SUMMARY OF THE INVENTION

I have invented a device, made substantially from low cost polymers, for insertion into a water rinse tank so that debris free water will be pumped from the tank while maintaining pump prime and keeping sand, grit and other debris within the tank. My device employs baffles within a cylindrical housing having annular openings and one or more elongated strainer elements inside the baffles connected to a pump to draw water through the device. A one way check valve is located between the strainer elements and the pump. A backwash element is connected to the strainer element or to the chamber containing the strainer elements to remove sand and grit lodging in or around the strainer filtering slots.

BRIEF DESCRIPTION OF THE DRAWINGS

The present invention may be best understood by those having ordinary skill in the art of water recovery devices by reference to the following detailed description when considered in conjunction with the accompanying drawings in which:

FIG. 1 is a partially cutaway section view of the housing and baffles and a perspective of the strainer element and valve housing.

FIG. 2 is a section view in elevation of the water recovery device of this invention.

DETAILED DESCRIPTION OF THE INVENTION

Figure 3:
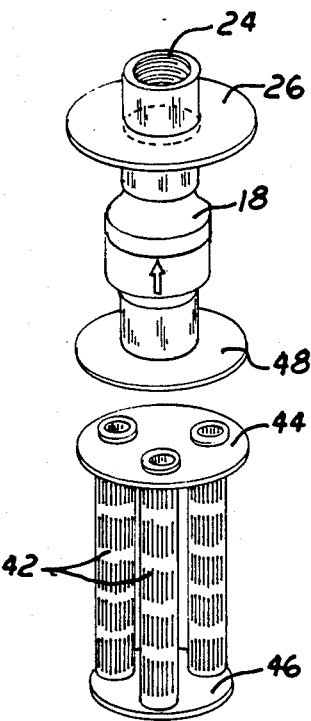
FIG. 3 is a perspective view of an alternate three strainer element with its valve housing.

Throughout the following detailed description the same reference numerals refer to the same elements in all figures.

The water recovery device 10 is set forth in detail in FIGS. 1 and 2. The device comprises an elongated cylindrical housing 12 about six to twelve inches in diameter, closed at a first end 11 and open at a second end 13. The housing 12 is made from a plastic material; i.e., a high strength polymer such as high density polyethylene, polyacrylic or polyvinyl chloride. The cylindrical wall 15 of housing 12 contains a multiplicity of annular openings 16. It is preferred to have four openings around the cylindrical wall 15 on one plane and another four openings in a separate parallel plane.

Inboard of the openings 16 in housing wall 15 are mounted one or more cylindrical baffles 14, positioned so as to be juxtaposed to the openings 16 in the wall 15 and spaced apart from the inside wall surface 17 of housing 12. The baffles 14 are mounted by a strut 19 permanently attached at one end to the baffle and at another end to a handgrip or knob 21 exterior to the housing wall 15. In this manner, the baffles impede the flow of water coming from an outside source through hole 16. The water impinges upon the side surface 23 of baffles 14 causing a turbulence.

A strainer element 40 is inserted inboard and spaced apart from the interior wall 25 of baffle 14. Alternatively, multiple strainers 42 are inserted in the same manner. The first end 28 of the strainer 40 is closed and the second end 24 is open. The inside surface of the second end 24 contains threads for engagement with threads on a submersible or centrifugal pump, not shown. The strainer 40 or multiple strainers 42 have an elongated cylindrical body with slots 22 through the side wall 38. Preferably, the slot openings are less than 200 mesh in diameter so that sand and other foreign particles are not allowed to pass through the slots 22. Instead, the sand or other particles are bounced around by the turbulent water and move out through the holes 16 and settle into the tank or other enclosure for the water source. The strained water passes through the slots 22 and through valve 20 located near the second end 24 of the strainer 40. The valve 20 is enclosed by valve housing 18. This one way valve allows water to move towards the pump but not return to the strainer 40 or strainers 42 to cause a loss in prime. A collar 26 is attached near the second end 24 of strainer 40. This collar has a slightly larger diameter of the annular opening 13 in housing 12 so that it closes opening 13.

Figure 4:
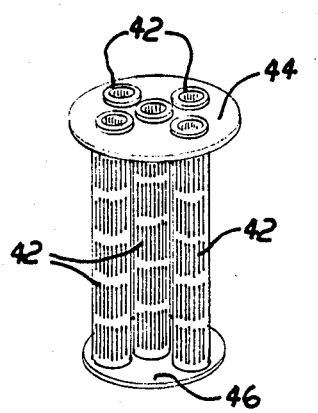
FIG. 4 is a perspective view of an alternate five strainer element.
Figure 5:
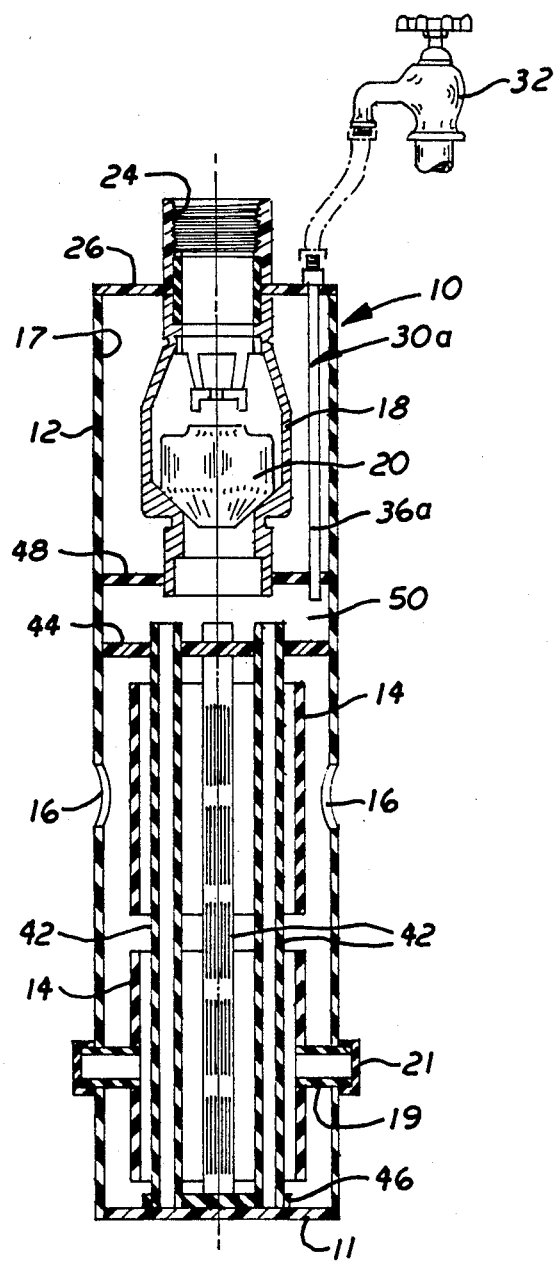
FIG. 5 is a section view in elevation of the water recovery device employing the alternate multiple strainers of FIG. 3.

When multiple strainers 42 are employed, they are mounted in a group as shown in FIGS. 3–5. The group of strainers are held together by top plate 44 and bottom plate 46. Bottom plate 46 is narrower than plate 44 to permit movement through the inside diameter of baffles 14. The pump housing 18 used with the multiple strainers 42 has a bottom collar 48 seated firmly against inside wall surface 17 of housing 12. FIGS. 3 and 4 are illustrative of the strainers that can be employed with this invention. Any number from one to five or more can be employed. The use of multiple strainers will permit the shortening of housing 12 so that the device can be deployed within small water enclosures.

The pump employed requires a low horsepower and would be a submersible or centrifugal type with ½ to 10 horsepower.

In order to remove sand or other grit and foreign particles collecting around slots 22, a backwash system 30 is connected to the device 10. Water is flowed under pressure from faucet 32 through piping 36 to the interior of strainer 40 via the backwash housing 34. The first end of the backwash system 30 is connected at about the midsection of strainer 40. The piping 36 of the backwash system 30 is located inboard of the housing inner wall surface 17 but outboard of the baffles 14. The piping can extend to the surface of the ground so that easy access can be obtained to faucet 32 at its second end. Normal water pressure will be sufficient to push sand, grit and other foreign particles from slots 22. The turbulence created by baffles 14 will cause the sand to move out through opening 16 and settle in the bottom of any tank that the device 10 is located within.

FIG. 5 shows the backwash system 30a employed with multiple strainers. In this mode the piping 36a ends in chamber 50. The backwash water moves down along the sides of strainer 42 to dislodge any sand or other debris around the slots 22.

All of the various elements of the water separating device 10 can be made of the same high strength polymer used to make housing 12 or a like polymer to prevent deterioration from either alkaline or acidic water conditions.

The water recovery device 10 is operated by activating the pump to cause a suction through holes 16 from the tank or other body of water where the water recovery device is located. The water passes through holes 16 and impinges upon baffles 14. Thereafter, the water moves through the slots 22, upstream through the strainer 40 or strainers 42, and through valve 20 to the pump source. The sand, grit or other foreign particles more than 200 mesh in diameter are prevented from moving through the strainer slots 22 by the restricted opening of such slots. The turbulent water caused by the baffles 14 promotes removal of the sand, grit and other foreign particles from the strainer 40 or strainers 42. Activation of the backwash system 30 or 30a causes water to pass outward from the interior of strainer 40 or along the sides of strainers 42. This action disengages any sand, grit or foreign particles trapped on the surface of slots 22, thus assuring full suction capacity without the need for costly periodic disassembly and cleaning.

Employing the system of my invention, an inexpensive method is available for straining particles from water in such a manner as to prevent sand, grit or other foreign particles from accumulating in valve 20 and causing loss of pump prime or a premature termination in the life of the water pump. My device will last for many years without the necessity of servicing and extends the life of any type of pump connected to the device.

As can be seen by one having ordinary skill in the art, equivalent elements can be substituted for the various elements in my water recovery device without departing from the scope of the invention.

Having thus described the invention, what is claimed and desired to be secured by Letters Patent is:

1. A water recovery device connected to a water pump comprising:
   (a) a polymer housing having a plurality of openings in an elongated cylindrical side wall, the housing having a closed first end and an annular open second end,
   (b) two cylindrical baffles integrally mounted within the polymer housing juxtaposed to the openings in the housing cylindrical side wall,
   (c) at least one elongated cylindrical strainer spaced apart from an interior wall of baffles, the strainer having a multiplicity of slots in an elongated cylindrical wall, a first end of the strainer being closed and a second end being open, the strainer open end being positioned downstream from a one way check valve, the valve mounted within a valve housing having an exterior collar adjacent a connection to the pump to close the second end of the polymer housing, and
   (d) a backwash element connected to the housing for clearing debris from the strainer or strainers.

2. The water recovery device according to claim 1 wherein there are at least eight openings in the elongated cylindrical side wall of the housing.

3. The water recovery device according to claim 1 wherein there are multiple hand hold knobs, each knob connected to an integral strut passing through the cylindrical side wall and connected to the baffle.

4. The water recovery device according to claim 1 wherein the slots in the strainer have a diameter opening of less than 200 mesh.

5. The water recovery device according to claim 1 wherein there is one strainer.

6. The water recovery device according to claim 1 wherein there are three strainers.

7. The water recovery device according to claim 1 wherein there are five strainers.

8. The water recovery device according to claim 5 wherein the backwash element is connected to a mid section of the strainer at a first end and to an above ground fixture at a second end, a water conduit separates the fixture from the strainer and at least a portion of the conduit is mounted inboard of the cylindrical housing wall and outboard of the baffle.

9. The water recovery device according to claim 6 wherein the backwash element is connected to a chamber within the housing at a first end and to an above ground fixture at a second end, a water conduit separates the fixture from the chamber and at least a portion of the conduit is mounted inboard of the cylindrical housing side wall.

10. The water recovery device according to claim 7 wherein the backwash element is connected to a chamber within the housing at a first end and to an above ground fixture at a second end, a water conduit separates the fixture from the chamber and at least a portion of the conduit is mounted inboard of the cylindrical housing sidewall.

11. A water recovery device connected to a pump mounted inside a holding tank, the device comprising:
   (a) a polymer housing having a plurality of openings in an elongated cylindrical side wall, the housing having a closed first end and an annular open second end,
   (b) at least two cylindrical baffle elements open at each end, mounted within the housing but spaced apart from an inside wall of the housing,
   (c) at least one elongated cylindrical strainer having a multiplicity of slots spaced apart from an inside wall of the baffles, a first end being closed and a second end positioned downstream from the pump,
   (d) a valve housing containing a one way valve and having a means for closing the second end of the cylindrical housing mounted between the strainer and the pump.

12. The water recovery device according to claim 11 wherein there are at least eight annular openings in the elongated cylindrical side wall of the housing.

13. The water recovery device according to claim 11 wherein the slots in the strainer have a diameter opening of less than 200 mesh.

14. A water recovery device located in a holding tank and connected to an above ground centrifugal pump, the device comprising:

(a) a polymer housing having a plurality of openings in an elongated cylindrical side wall, the housing having a closed first end and an annular open second end, (b) at least two cylindrical baffle elements open at each end, mounted within the housing but spaced apart from an inside wall of the housing, (c) at least one elongated cylindrical strainer having a multiplicity of slots spaced apart from an inside wall of the baffles, a first end being closed and a second end positioned downstream from the pump, (d) a valve housing containing a one way valve and having a means for closing the second end of the cylindrical housing mounted between the strainer and the pump.

15. A method of separating suspended particles of sand, grit or other foreign particles from water comprising:

(a) sucking the water through a multiplicity of openings in an elongated cylindrical polymer housing, the housing having a closed first end and an annular open second end, (b) obstructing the flow of water through the openings by positioning two cylindrical baffles inboard and spaced apart from an inside wall of the housing, and (c) having at least one strainer mounted inboard of the baffles, the strainer having a multiplicity of slots in an elongated cylindrical wall to prevent the egress of the particles but allowing the pasage of water to a pumping source which has created the suction, a one way valve interposed between the strainer and the pump.

16. A method according to claim 15 wherein the slots have a diameter of less than 200 mesh.

17. The method according to claim 15 wherein there are three strainers mounted inboard of the baffle element.

18. The method according to claim 15 wherein there are five strainers mounted inboard of the baffles.

* * * * *